United States Patent
Leong et al.

(10) Patent No.: US 7,710,570 B2
(45) Date of Patent: May 4, 2010

(54) LIGHT PIPE FOR LOW PROFILE OPTICAL NAVIGATION SYSTEMS

(75) Inventors: Yat Kheng Leong, Selangor (MY); Sai Mun Lee, Penang (MY); Kok Khian Ng, Penang (MY)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 55 days.

(21) Appl. No.: 12/105,607

(22) Filed: Apr. 18, 2008

(65) Prior Publication Data

US 2009/0262368 A1   Oct. 22, 2009

(51) Int. Cl.
*G01N 21/55* (2006.01)
*F21V 5/00* (2006.01)

(52) U.S. Cl. .................. 356/445; 345/163; 345/166

(58) Field of Classification Search ......... 356/445–448; 250/206.1, 221, 239, 557, 559.44, 234; 382/124, 382/187, 312; 362/311, 346, 615, 619, 623, 362/625
See application file for complete search history.

(56) References Cited

U.S. PATENT DOCUMENTS

| | | | | |
|---|---|---|---|---|
| 3,663,083 A | * | 5/1972 | Friedman et al. | 385/146 |
| 4,287,414 A | * | 9/1981 | Soo et al. | 250/227.11 |
| 5,586,212 A | * | 12/1996 | McConica et al. | 385/146 |
| 6,476,970 B1 | * | 11/2002 | Smith | 359/618 |
| 6,538,243 B1 | * | 3/2003 | Bohn et al. | 250/208.1 |
| 6,967,321 B2 | * | 11/2005 | Leong et al. | 250/239 |
| 7,399,955 B2 | * | 7/2008 | Lee et al. | 250/221 |
| 7,492,461 B2 | * | 2/2009 | Hebert et al. | 356/446 |
| 7,568,819 B2 | * | 8/2009 | Lee et al. | 362/346 |
| 2002/0080117 A1 | * | 6/2002 | Son et al. | 345/163 |
| 2004/0084610 A1 | * | 5/2004 | Leong et al. | 250/221 |
| 2004/0208348 A1 | * | 10/2004 | Baharav et al. | 382/124 |
| 2005/0087601 A1 | | 4/2005 | Gerst et al. | |
| 2005/0253058 A1 | * | 11/2005 | Leong et al. | 250/239 |
| 2008/0100936 A1 | * | 5/2008 | Theytaz et al. | 359/838 |
| 2009/0159788 A1 | * | 6/2009 | Tang et al. | 250/239 |

* cited by examiner

*Primary Examiner*—Hoa Q Pham

(57) ABSTRACT

A light pipe for an optical navigation system. The light pipe includes a collection surface, a collimation surface, and a reflective surface. The collection surface is to accept incident light into the light pipe from a light source. The collimation surface is to collimate the light and to direct the collimated light to a navigation plane for detection by a navigation sensor. The reflective surface is between the collection surface and the collimation surface and is to reflect the light along a reflective path as the light travels within the light pipe from the collection surface to the collimation surface. The reflective surface has a curved geometry oriented substantially along the path of travel of the light through the light pipe. The curved geometry of the reflective path facilitates convergence of the light with respect to a first axis.

19 Claims, 5 Drawing Sheets

LIGHT PIPE FOR LOW PROFILE OPTICAL NAVIGATION SYSTEMS

BACKGROUND OF THE INVENTION

Optical navigation sensors use a light source to illuminate a navigation surface to provide digital images for computing motion. However, as the spatial requirements of optical devices become more constrained, traditional light sources such as standard light-emitting diodes (LEDs) are replaced by smaller sources. In general, the available smaller sources have a lower power consumption, broader radiation patterns, and lower light intensity.

For optical mouse sensors, a typical imaged navigation surface is a surface such as a desktop or a mouse pad. Since this surface is to be lit in order to obtain an image, the light source should generate light with enough intensity to sufficiently illuminate the surface to obtain an adequate image for the generation of a navigation signal.

For a low profile illumination and sensor system with a total system height requirement of less than 5 mm, through-hole LED light sources can no longer be implemented in the system using conventional methods. One part of a solution to this spatial constraint is the replacement of the conventional LED with a low-profile LED, such as a Chip LED, Top LED, or a bare LED die as the light source. The result of replacing a conventional LED with the mentioned low-profile LED is that the radiation pattern of the low-profile LED has a lower light intensity due to the fact that the light is spread across a significantly wider angle. For example, the field of emitted light can be up to 160° at full angle. Such a large angle reduces power concentration and results in a lower light intensity. Due to this, it is difficult to collect the wide angle light, guide it properly, and emit the light with an intensity sufficient to obtain an adequate navigation image.

SUMMARY OF THE INVENTION

Embodiments of an apparatus are described. In one embodiment, the apparatus is a light pipe for an optical navigation system. Embodiments of the apparatus include a collection surface, a collimation surface, and a reflective surface. The collection surface accepts incident light into the light pipe from a light source. The collimation surface collimates the light and directs the collimated light to a navigation surface for detection by a navigation sensor. The reflective surface is between the collection surface and the collimation surface. The reflective surface reflects the light along a reflective path as the light travels within the light pipe from the collection surface to the collimation surface. The reflective path has a curved geometry, oriented substantially along the path of travel of the light through the light pipe, which facilitates convergence of the light with respect to a first axis. Other embodiments of the apparatus are also described.

Embodiments of a system are also described. In one embodiment, the system is an optical navigation system for an electronic device. Embodiments of the optical navigation system include a light source, a light pipe, and a navigation sensor. The light source generates light. The light pipe transmits light from the light source along a reflective path. The light pipe has a conic geometry. The conic geometry causes total internal reflection of the light from the light source. The navigation sensor detects light at a navigation surface and produces a navigation image from the detected light. Other embodiments of the system are also described.

Embodiments of another apparatus are also described. In one embodiment, the apparatus is an apparatus to illuminate a navigation surface. The apparatus includes means for collecting light from a light source. The apparatus also includes means for causing total internal reflection of the light within a light pipe. The apparatus also includes means for focusing the light along a first axis orthogonal to the path of the light within the light pipe. The apparatus also includes and means for directing the light to illumination a navigation surface. Other embodiments of the apparatus are also described.

Other aspects and advantages of embodiments, of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
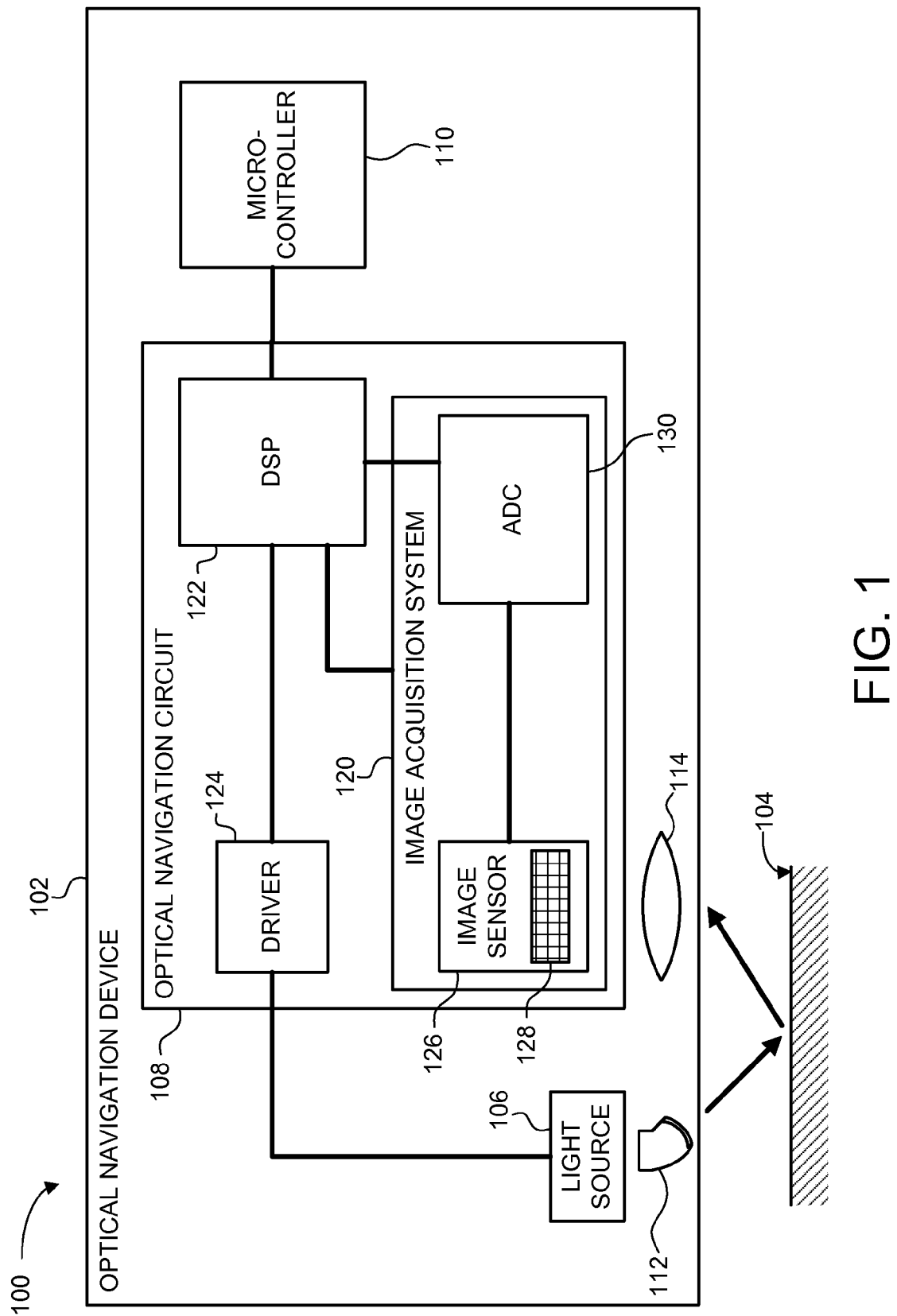
FIG. 1 depicts a schematic block diagram of one embodiment of an optical navigation system.

FIG. 1 depicts a schematic block diagram of one embodiment of an optical navigation system 100. The illustrated optical navigation system 100 includes an optical navigation device 102 and a navigation surface 104. The optical navigation device 102 emits a light signal which is at least partially reflected by the navigation surface 104. The optical navigation device 102 detects the reflected light signal and processes the reflected light signal, as described below.

It should be noted that the distance between the optical navigation device 102 and the navigation surface 104 may vary depending on the application for which the optical navigation device 102 is used. In surface navigation applications, the optical navigation device 102 may be relatively close to the navigation surface 104. For example, the optical navigation device 102 may be in physical contact with the navigation surface 104, or the optical navigation device 102 may be within a few centimeters or inches of the navigation surface 104. Alternatively, in free space navigation applications, the optical navigation device 102 may be relatively far from the navigation surface 104. For example, the optical navigation device 102 may operate outside of the surface navigation optical range.

The depicted optical navigation device 102 includes a light source 106, an optical navigation circuit 108, a microcontroller 110, a light pipe 112, and an optical element 114. Other embodiments may include fewer or more components. For example, some embodiments of the optical navigation device 102 may exclude the optical element 114.

In one embodiment, the light source 106 is a light emitting diode (LED). In another embodiment, the light source 106 is a laser. Alternatively, the light source 106 may be another type of light source. With regard to the light pipe 112, examples of different embodiments are shown in the following figures and described in more detail below.

The depicted optical navigation circuit 108 includes an image acquisition system (IAS) 120, a digital signal processor (DSP) 122, and a driver 124. In one embodiment, the driver 124 of the optical navigation circuit 108 controls the operation of the light source 106 (e.g., using a driver signal) to generate the light signal that is transmitted through the light pipe 112 to the navigation surface 104. The reflected light signal is then received through the other optical element 114 and detected by the image acquisition system 120.

The depicted image acquisition system 120 includes a navigation sensor 126, which includes a pixel array 128. In one embodiment, the navigation sensor 126 generates a plurality of electrical signals corresponding to incident light at the pixel array 128. Each of the electrical signals corresponds to one of the picture elements (or pixels) of the pixel array 128. In one embodiment, each pixel is a photosensor or other photosensitive device. The light signal reflected from the navigation surface 104 is incident on the pixel array 128. In one embodiment, the optical element 114 facilitates resolution of microscopic surface images at the pixel array 128. Alternatively, the optical element 114 facilitates resolution of more distant objects in a free space navigation environment.

The analog-to-digital converter (ADC) 130 converts the plurality of reconfigured electrical signals, received from the pixel array 128 of the navigation sensor 126, from analog signals to digital signals. The ADC 130 then passes the digital signals to the digital signal processor 122.

After the digital signal processor 122 receives the digital form of the electrical signals from the ADC 130 of the image acquisition system 120, the digital signal processor 122 may perform additional processing using the digital signals. The digital signal processor 122 then transmits one or more signals to the microcontroller 110. Exemplary types of signals transmitted from the digital signal processor 122 of the optical navigation circuit 108 to the microcontroller 110 include channel quadrature signals based on Δx and Δy relative displacement values. These signals, or other signals, may be indicative of a movement of the optical navigation device 102 relative to the navigation surface 104.

Alternatively, the signals, or other signals, may be indicative of a movement of the optical navigation device 102 relative to a distant object or surface in a free space navigation environment. Other embodiments of the digital signal processor 122 may transmit other types of signals to the microcontroller 110. In one embodiment, the microcontroller 110 implements a variety of functions, including transmitting data to and receiving data from a host computer system (not shown).

In some embodiments, the optical navigation device 102 may include multiple light pipes with one or more light sources to provide additional illumination to the navigation surface 104. Other embodiments may include additional lenses (not shown) coupled with additional navigation sensors to facilitate free-space navigation. In other words, the optical navigation device 102 may include both surface and free space navigation optics to facilitate surface and free space navigation.

In some embodiments, the optical navigation device 102 may function as a free space and surface navigation device. In some embodiments, the optical navigation device 102 may include a proximity sensor (not shown) to detect the presence or lack of a contact surface 104. The proximity sensor may be used to activate the light source 106 in the presence of a contact surface 104 or deactivate the light source 106 if no contact navigation surface 104 is in range. In some embodiments, the optical navigation device 102 may utilize ambient light as sufficient illumination to generate a navigation image for free space navigation.

Figure 2:
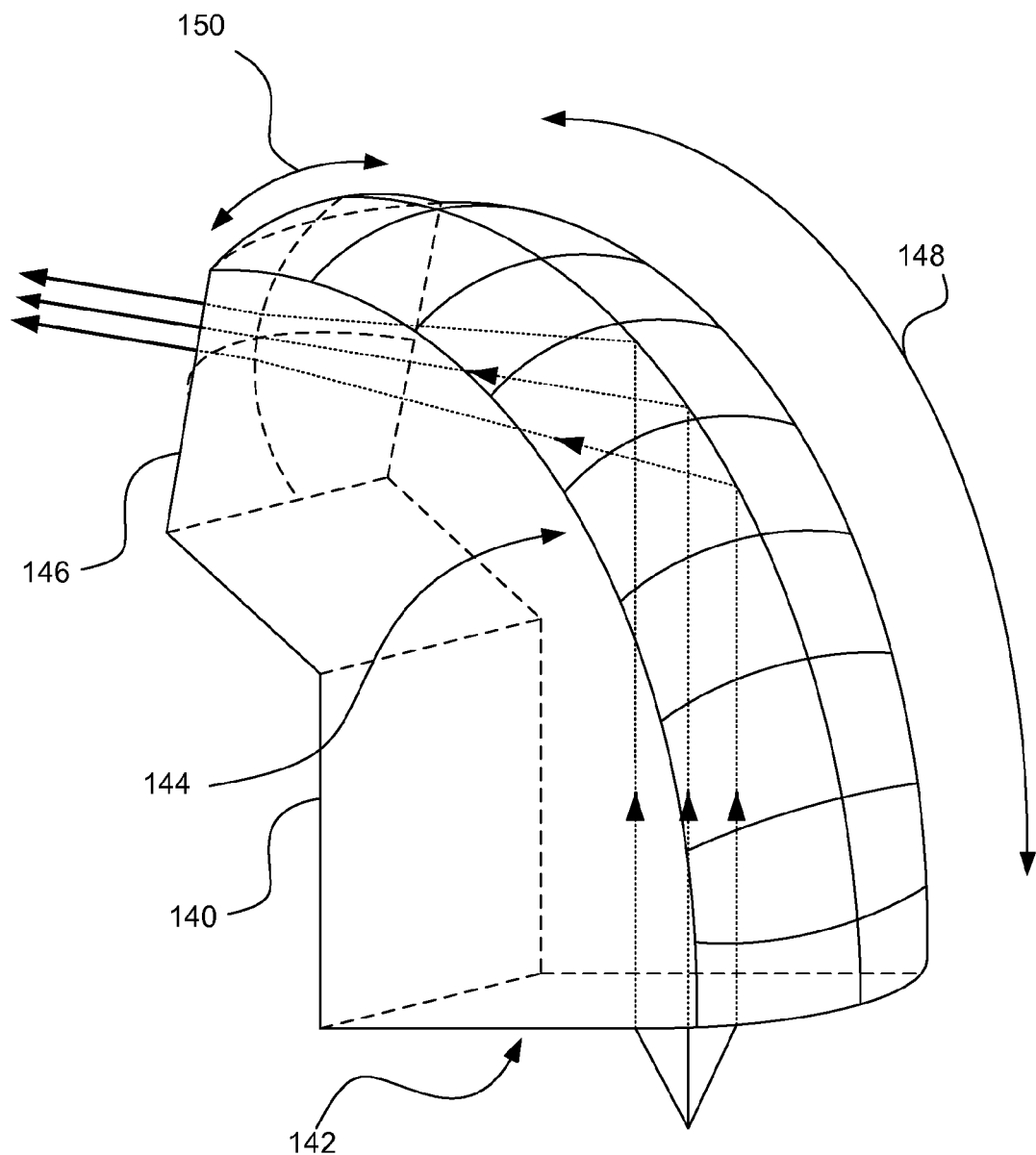
FIG. 2 depicts a perspective view of one embodiment of a light pipe apparatus.

FIG. 2 depicts a perspective view of one embodiment of a light pipe apparatus 140. The light pipe 140 is one example of an embodiment of the light pipe 112 of FIG. 1. In general, the light pipe 140 may be made of a plastic, glass, or another light transmissive material. Additionally, the light pipe 140 may be a unitary structure composed of a single material. Conversely, the light pipe 140 may be constructed of several individual components with specific materials or properties. The individual components of the light pipe 140 may be joined together in one aggregate structure or, in another embodiment, individual components of the light pipe 140 may be separate. The individual components may function in combination to produce the same effect as a unitary construction light pipe 140.

In general, embodiments of the light pipe 140 function to increase the intensity of the light from the light source by essentially converging the light to a more focused distribution pattern. For example, light distribution or light density is measured in lux (lumens per square meter). Embodiments of the light pipe 140 function to increase the amount of light in a unit of space. The light source 106 generates light in a given density. The light is directed into the light pipe 140. The light pipe 140 converges the light by reflecting the light rays at angles which move the light rays closer to the central axis of the light distribution pattern. The light then has a higher density, or number or rays, (lumens) per unit of space (square meter). Illumination of the navigation surface 104 with high density light further facilitates the generation of a navigation image.

The illustrated light pipe 140 includes a collection surface 142, a reflective surface 144, and a collimation lens 146. In one embodiment, the collection surface 142 directs light from the light source 106 into the light pipe 140. In some embodiments, the collection surface 142 includes a collection lens (described below with respect to FIG. 3). The collection surface 142 directs the light to the reflective surface 144.

In one embodiment, the reflective surface 144 is contoured along a curvature or an angle with relation to the incident light to cause total internal reflection of the light within the light pipe 140. In another embodiment, the reflective surface 144 is formed by applying a reflective coating to the exterior of the structure of the light pipe 140. In another embodiment, the reflective surface 144 is formed by diffusing a reflective material, for example, silver, into the structure of the light pipe 140 to form the reflective surface 144 on the interior of the light pipe 140. The reflective surface 144 may be further contoured with curvatures in one or more directions to converge the light and, thus, intensify the light as the light passes through the light pipe 140. For ease of explanation, these curvatures, or curved geometries, are referred to herein as conic properties, or geometries, of the light pipe 140.

The light is then focused by the conic geometries 148 and 150 of the reflective surface 144. In one embodiment, the first conic geometry 148 is a curved geometry oriented along the path of travel of the light through the light pipe 140. The curved geometry of the reflective path 144 facilitates convergence of the light with respect to a first axis. In another embodiment, the reflective surface 144 includes a second conic geometry 150 in addition to the first conic geometry 148. The second conic geometry 150 is a curved geometry of the reflective surface 144 and is oriented orthogonal with respect to the first conic geometry 148 and orthogonal to the path of light through the light pipe 140. The second curved geometry 150 further applies a converging effect to the light before the light reaches the collimation surface 142.

In one embodiment, the conic geometries 148 and 150 have constant radii of curvature. In some embodiments, the conic geometries 148 and 150 have variable radii of curvature along the length or width of the light pipe 140. In one embodiment, the first conic geometry 148 focuses the light with respect to a vertical axis. The second conic geometry 150 focuses the light with respect to a horizontal axis. In some embodiments, different orientations of the light pipe 140 result in different axes of focus.

The light is collimated and transmitted from the light pipe 140 by the collimation lens 146. In one embodiment, the collimation lens 146 is spherical. An example of a spherical collimation lens 146 is shown in FIG. 2. In another embodiment, the collimation lens 146 is cylindrical. An example of a cylindrical collimation lens 166 is shown in FIG. 2. Other embodiments may implement other geometries for the collimation lens 146.

Figure 3:
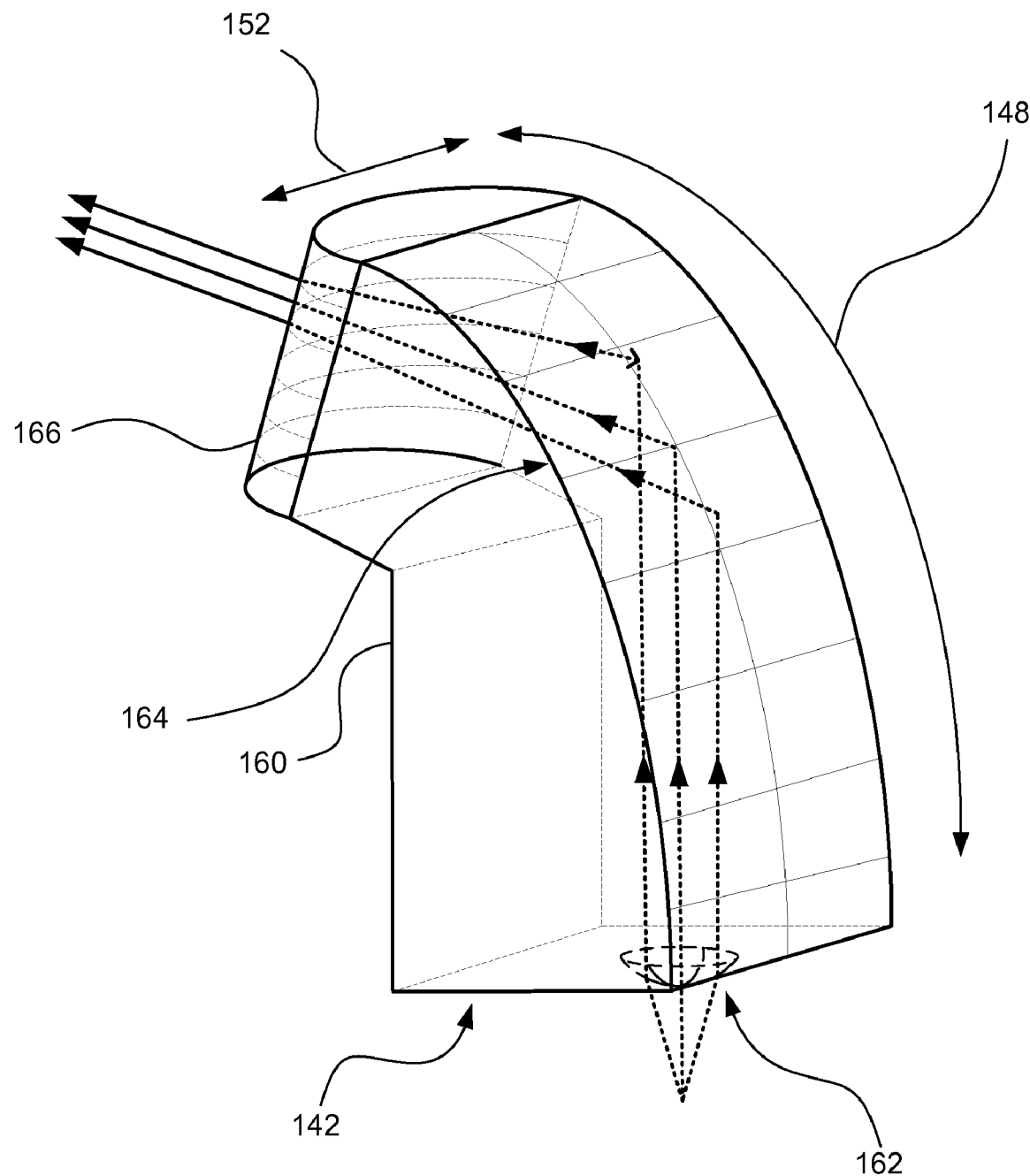
FIG. 3 depicts a perspective view of another embodiment of a light pipe apparatus.

FIG. 3 depicts a perspective view of another embodiment of a light pipe apparatus 160. The light pipe 160 is another example of an embodiment of the light pipe 112 of FIG. 1. The illustrated light pipe 160 includes a collection surface 142, a collection lens 162, a reflective surface 164, and a collimation lens 166. In one embodiment, the collection surface 142 may be as described above, the illustrated light pipe 140 includes a planar collection lens 162 located on the collection surface 142. The collection lens 162 may be of the same or a different index of refraction compared to the rest of the light pipe 160. In some embodiments, the collection lens 162 has a radius of curvature equal to approximately one-half the width of the light pipe 160. Other embodiments may implement other radii of curvature in the collection lens 162. Additionally, some embodiments may implement a non-spherical collection lens 162. In some embodiments, the collection lens 162 is of a different material as the collection surface 142. In another embodiment, the collection lens 162 is of the same material as the collection surface 142.

In general, the collection lens 162 collects incident light from the light source 106 and directs the light into the light pipe 160. The light is directed to the reflective surface 164. In one embodiment, the reflective surface 164 is contoured along a curvature or an angle with relation to the incident light to cause total internal reflection of the light within the light pipe 160. In another embodiment, the reflective surface 164 is formed by applying a reflective coating to the exterior of the structure of the light pipe 160. In another embodiment, the reflective surface 164 is formed by diffusing a reflective material, for example, silver, into the structure of the light pipe 160 to form the reflective surface 164 on the interior of the light pipe 160. The reflective surface 164 may be further contoured with curvatures in one or more directions to converge the light and, thus, intensify the light as the light passes through the light pipe 160. For ease of explanation, these curvatures, or curved geometries, are referred to herein as conic properties, or geometries, of the light pipe 160.

Figure 4:
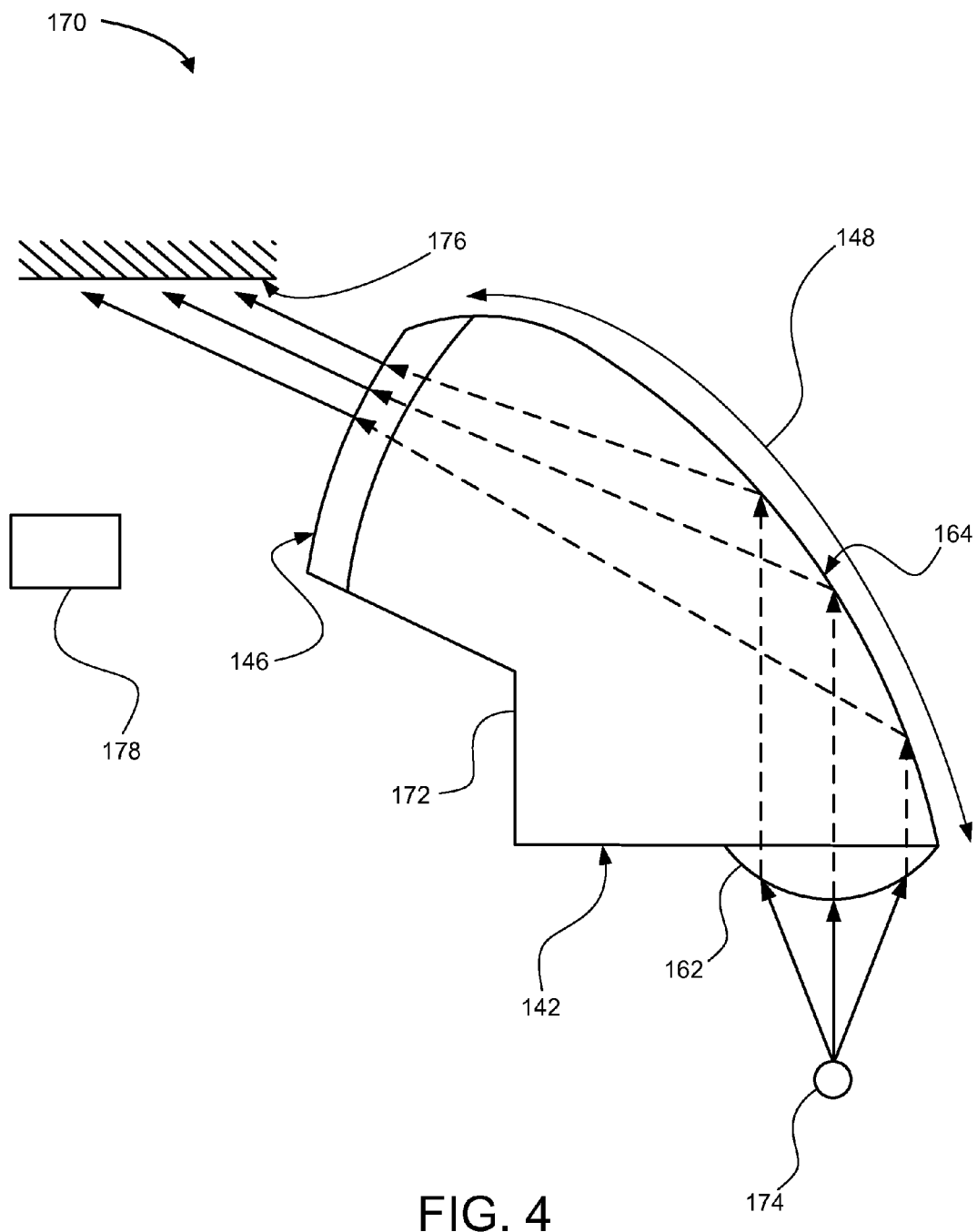
FIG. 4 depicts a side view of another embodiment of an optical navigation system.

FIG. 4 depicts a side view of another embodiment of an optical navigation system 170. The illustrated optical navigation system 170 includes a light source 174, a light pipe 172, a navigation surface 176, and a navigation sensor 178. In one embodiment, the light source 174 is a low-profile light emitting diode such as a top LED or Chip LED. In another embodiment, the light source 174 is a bare LED die. The light pipe 172 is another example of an embodiment of the light pipe 112 of FIG. 1. The illustrated light pipe 172 includes a collection surface 142, a collection lens 162, a reflective surface 164, and a collimation lens 146. The profile of the light pipe 172 illustrates the first conic geometry or curvature of the light pipe 172.

In one embodiment, the collection surface 142 is planar and includes the collection lens 162. The collection lens 162 collects light incident to the collection lens 162 and transmits the light to the interior of the light pipe 172 as described above. The light is reflected from the reflective surface 164 and focused along a converging path according to the first conic geometry 148. In other words, the first conic geometry 148 of the light pipe 172 causes the reflected light to converge as it approaches the collimation lens 146. This convergence of the light increases the integrity of the light at the collimation lens 146 compared to the light at the collection lens 162. It should be noted that the first conic geometry 148 of the light pipe 172 only causes convergence in a first direction substantially orthogonal to the direction of the light propagation.

The light is then collimated by the collimation lens 146. In one embodiment, the collimation lens 146 is spherical in geometry. In the illustrated embodiment, the light is directed from the collimation lens 146 to the navigation surface 176. The navigation surface 176 is sufficiently illuminated to produce a navigation image, which is detected by the navigation sensor 178.

Figure 5:
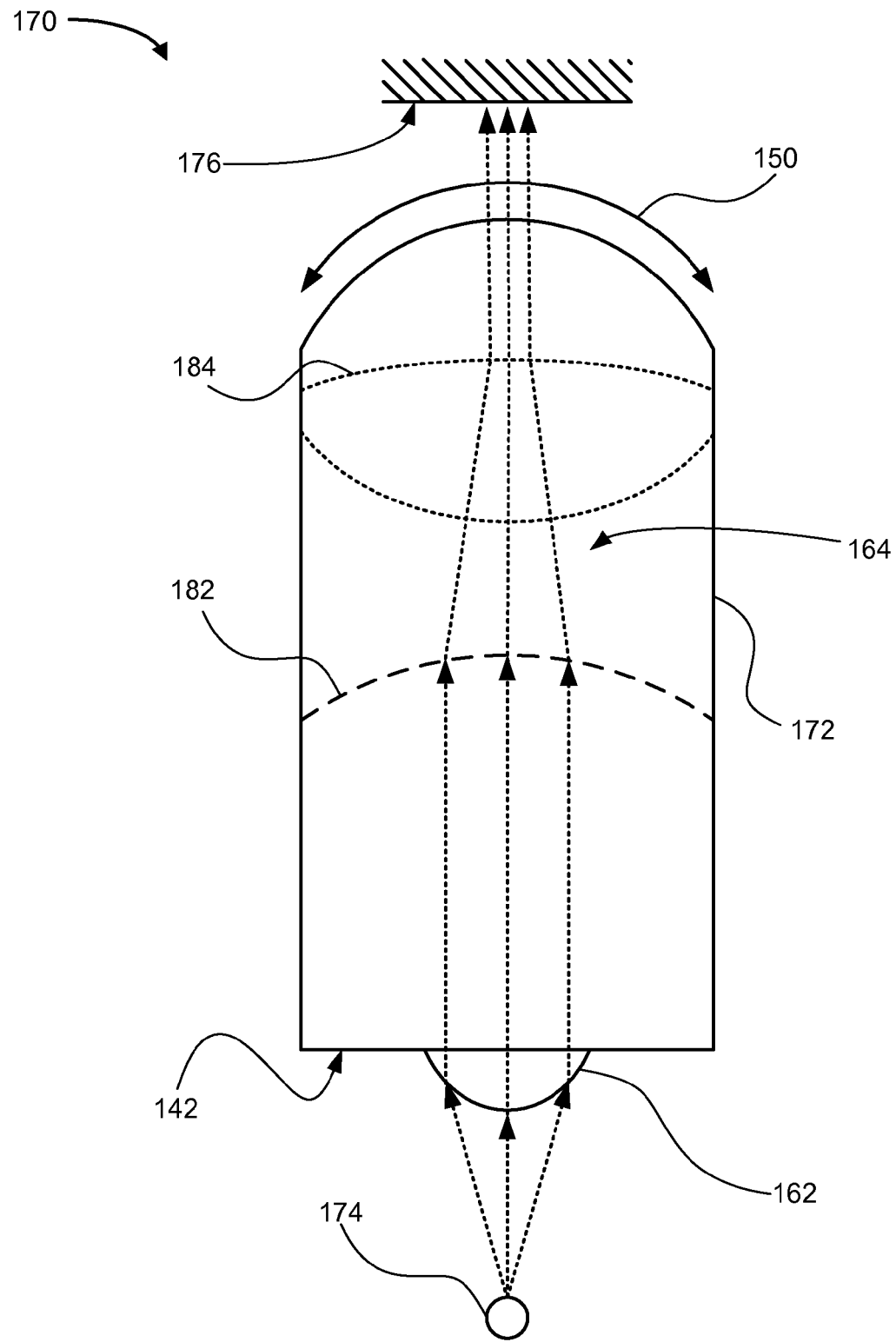
FIG. 5 depicts a rear view of the optical navigation system of FIG. 4.

FIG. 5 depicts a rear view of the optical navigation system 170 of FIG. 4. The optical navigation system 170 includes the light source 174, the light pipe 172, and the navigation surface 176. The collection lens 162 collects light incident to the collection lens 162 and transmits the light to the interior of the light pipe 172 as described above. The light is reflected from the reflective surface 164 and focused along a converging path according to the second conic geometry 150. In other words, the second conic geometry 150 of the light pipe 172 causes the reflected light to converge as it approaches the collimation lens 146 of FIG. 4. This convergence of the light increases the integrity of the light at the collimation lens 146 compared to the light at the collection lens 162. It should be noted that the second conic geometry 150 of the light pipe 172 only causes convergence in a second direction substantially orthogonal to the direction of the light propagation and orthogonal to the first direction of convergence of the first conic geometry 148.

The reflection locality 182, or the approximate location at which light is reflected at the reflective surface 164, is shown to depict the approximate point at which the light is incident on the reflective surface 164. The emission locality 184, or the approximate location at which the light propagates out of the light guide 170 (e.g., emitted from the collimation lens 146) and, in some embodiments, becomes at least partially collimated.

One application of the optical navigation system 170 is to process a sequence of images produced by the navigation sensor 178 to determine the relative motion of the navigation surface 176. For example, when the navigation surface 176 is present and is illuminated adequately by light generated by the light source 174 and intensified by the light pipe 172, the resulting image, reflected as light at the navigation surface 176, is detected by the navigation sensor 178 and is used as the navigation image. The light from the light source 174 is passed through the light pipe 172, as described above. The navigation sensor 178 produces navigation images from the light, over time, and converts a sequence of navigation images into corresponding electrical signals that may be used to detail the relative motion of the navigation surface 176 by relative comparison of the signals generated over time.

Some embodiments of the optical navigation system, using an embodiment of the light pipes described herein, provide sufficient illumination to the navigation surface to generate navigation signal. Other embodiments of the light pipe described herein provide factors of intensification that facilitate the use of a low-profile light source. Some embodiments of the light pipe described herein facilitate the collimation of light to illuminate more evenly the navigation surface. Other embodiments of the light pipe apparatus facilitate the manipulation of the angle of incidence of light on the navigation surface.

Although specific embodiments, of the invention have been described and illustrated, the invention is not to be limited to the specific forms or arrangements of parts so described and illustrated. The scope of the invention is to be defined by the claims appended hereto and their equivalents.

What is claimed is:

1. A light pipe for an optical navigation system, the light pipe comprising:
    a collection surface to accept incident light into the light pipe from a light source;
    a collimation surface to collimate the light and to direct the collimated light to a navigation surface for detection by a navigation sensor; and
    a reflective surface between the collection surface and the collimation surface, the reflective surface to reflect the light along a reflective path as the light travels within the light pipe from the collection surface to the collimation surface, wherein the reflective surface has a curved geometry oriented substantially along the path of travel of the light through the light pipe, wherein the curved geometry of the reflective surface facilitates convergence of the reflected light in a first direction that is approximately orthogonal with respect to the reflective path.

2. The light pipe of claim 1, wherein the reflective surface has a second curved geometry oriented substantially orthogonal to the path of travel of the light through the light pipe, wherein the second curved geometry of the reflective path facilitates convergence of the reflected light in a second direction that is approximately orthogonal with respect to the reflective path and the first direction.

3. The light pipe of claim 2, wherein the reflective surface has biconic geometry defined by a combination of the curved geometry and the second curved geometry.

4. The light pipe of claim 1, wherein the curved geometry of the reflective surface is configured to cause total internal reflection of the light within the light pipe.

5. The light pipe of claim 1, wherein the collection surface comprises a planar surface.

6. The light pipe of claim 1, wherein the collection surface comprises a condenser lens to collect the incident light.

7. The light pipe of claim 1, wherein the collimation surface comprises a cylindrical lens.

8. The light pipe of claim 1, wherein the collimation surface comprises a spherical lens.

9. An optical navigation system for an electronic device, the optical navigation system comprising:
    a light source;
    a light pipe to transmit light from the light source along a reflective path, the light pipe comprising a reflective surface comprising a conic geometry, wherein the conic geometry facilitates total internal reflection of the light from the light source, the light pipe to collimate the light from the light source; and
    a navigation sensor to detect light at a navigation surface and to produce a navigation image from the detected light.

10. The optical navigation system of claim 9, wherein the reflective surface comprises a second conic geometry.

11. The optical navigation system of claim 10, wherein the conic and second conic geometries are configured to apply a converging effect to the light between the reflective surface and a collimation surface.

12. The optical navigation system of claim 9, wherein the light source comprises a low-profile light-emitting diode (LED).

13. The optical navigation system of claim 12, wherein the light source comprises a bare LED die.

14. The optical navigation system of claim 9, wherein the light pipe is configured to transmit the light along the reflective path from the light source to the navigation surface to provide illumination for the navigation sensor, wherein the conic geometry of the light pipe is configured to apply a converging effect to the light.

15. The optical navigation system of claim 9, wherein the light pipe comprises a collimation surface to collimate the light from the light source and direct the collimated light to approximately the navigation surface.

16. The optical navigation system of claim 9, wherein the navigation sensor is configured to generate a navigation signal corresponding to an image of the navigation surface, wherein the navigation surface is illuminated by the light emitted by the light pipe.

17. An apparatus to illuminate a navigation surface, the apparatus comprising:
    means for collecting light from a light source;
    means for causing total internal reflection of the light within a light pipe;
    means for focusing the light along a first axis orthogonal to the path of the light within the light pipe;
    means for directing the light to illuminate a navigation surface; and
    means for intensifying the light wherein the cross-sectional area of the light at the navigation surface is reduced.

18. The apparatus of claim 17, further comprising means for focusing the light along a second axis orthogonal to the path of the light and orthogonal to the first axis.

19. The apparatus of claim 17, further comprising means for collimating the light to illuminate the navigation surface.

* * * * *